United States Patent [19]
Bechu

[11] Patent Number: 4,971,285
[45] Date of Patent: Nov. 20, 1990

[54] ELASTIC SUPPORT FOR A DECORATIVE OR PROTECTIVE TRIM PART

[75] Inventor: Jean-Pierre Bechu, Courbevioe, France

[73] Assignee: Caoutchouc Manufacture et Plastiques S.A., Versailles, France

[21] Appl. No.: 438,104

[22] Filed: Nov. 16, 1989

[30] Foreign Application Priority Data

Nov. 17, 1988 [FR] France .................. 88 14945

[51] Int. Cl.$^5$ .............................. F16M 13/00
[52] U.S. Cl. ................. 248/634; 267/141.7; 403/133; 403/140
[58] Field of Search ............ 248/634, 635, 345.1; 267/141.1, 141.2, 141.3, 141.7, 153, 294; 403/56, 133, 140, 135

[56] References Cited

U.S. PATENT DOCUMENTS

| | | | |
|---|---|---|---|
| 2,160,297 | 5/1939 | Thompson | 248/635 |
| 2,292,675 | 8/1942 | Thiry | 403/133 |
| 3,124,971 | 3/1964 | Peters et al. | 403/56 X |
| 4,704,043 | 11/1987 | Hackman et al. | 403/56 |
| 4,781,365 | 11/1988 | Harrison | 248/634 X |

*Primary Examiner*—David M. Purol
*Attorney, Agent, or Firm*—Nils H. Ljungman & Associates

[57] ABSTRACT

Elastic support having deformable ball and socket joints for fastening a trim piece between two mobile elements, permitting the trim piece to remain in a median position, which includes two ball and socket joints exhibiting an elastic recall due to the adherized (or vulcanized) rubber-metal bond, the external rings being permanently fitted into a common assembly tube, the internal rings, in the shape of ball and socket joints, being permanently connected by fasteners in a plane in which the principal relative back-and-forth movements take place, and coming into contact with a thrust washer, by an axial thrust allowing a damping friction effect upon back-and-forth movements.

17 Claims, 1 Drawing Sheet

ELASTIC SUPPORT FOR A DECORATIVE OR PROTECTIVE TRIM PART

1. Field of the Invention:

The present invention relates to elastic supports employing a rubber-metal bond between a bolt and/or a nut adherized (or "vulcanized") to an elastically deformable mass, and is used to hold decorative or protective trim in place in a vehicle or bridge or gangplank, when the support is moved.

The present invention achieves a desired result by the connection of adhered parts into an assembly, using a method similar to that used for elastic articulations. Friction, on surfaces having a low coefficient of friction, ensures the geometric positioning against a permanent stop and also the damping of lateral back-and-forth movements.

2. Description of the Prior Art:

Means for the elastic support of a trim part, when the base of support undergoes relative movements, currently utilize elastomers. The chemical bond achieved during the vulcanization between the fastening bases, plates, bolts or nuts—most frequently made of metal—and the elastically deformable mass, made of natural or synthetic rubber, contributes the necessary flexibility and the elastic recoil between the two solid members being connected.

Each rubber manufacturer offers a range of standard products responding to these problems. For Caoutchouc Manufacture et Plastiques, Form 79-A3 describes the "Double-U" family of antivibration supports, Ref. M.9001-9002-9003, where two rubber parallelepipeds elastically connect two opposing U-shaped metal frames. Form 79-A2 also describes rubber parallelepiped sandwiches connecting two flat armatures, such as Ref. M4001, or, more particularly, Ref. M4004, with inclined surfaces. The latter makes possible lateral back-and-forth movements, parallel to the contact surfaces of up to 24 millimeters. The total height between these surfaces being 40 millimeters.

Nevertheless, such pieces, because of their geometry, even with the lowest elastomeric moduli which can be employed, require reactions under imposed movements approaching 100 to 200 daN, which excludes them from use for the elastic support of lightweight trim parts such as those found in articulated railway or road vehicles. Certain manufacturers lighten the pieces by means of a reduced cross section which, under moderate strains, permits the significant deformations desired. Thus a toroidal coil, having a reel shape, is fabricated by several rubber manufactures, both in synthetic rubber and in polyurethane. Such designs in particular are used in joints for masts on windsurfer boards.

The reduced strains in such devices have, as a corollary, a significant risk of rupture, and the improvements—in addition to the use of an exterior safety chain or cable—consist of embedding in the elastomer a steel wire cable which provides protection against excessive tension. Such an arrangement, for example, is the object of French Pat. No. 2,509,000 (Wager), and of German Pat. No. 11 03 773 (Auto-Union), which is more particularly applicable to automobile engine mounts. The need to incorporate a safety device is sufficient indication that these products have difficulty achieving a high fatigue strength and thus must be replaced frequently.

Catalogue 2021-3, published by the KLEMECA Subdivision of KLEBER, discloses small "low frequency" support pieces, which have since been abandoned, the largest models of which were able to provide the desired deformability due to their deformable ring shape connecting two fastening elements. This design involved an elastic hold-down which was somewhat flexible in all directions, and had the disadvantages, on the one hand, of a significant deflection under the force of gravity, and, on the other hand, of an excessively flexible positioning in perpendicular directions. To support a decorative or protective trim part exposed to permanent back-and-forth movements of several centimeters, there was nothing in the design to either damp or limit the geometric positions of the parts in case of periodic excitation.

OBJECT OF THE INVENTION

One object of the present invention is to provide an easily realizable solution which generally meets all the requirements for elastic support of a decorative or protective trim part, for use in an articulated vehicle or an access ramp to a ship or aircraft. In one embodiment, when the base thereof, which serves as the point of contact with the support, is subjected to significant periodic or random displacements in the plane of this contact, for example, if the distance between the various points of contact undergoes variations of several centimeters which are large in relation to the desired arrangement of the supports, but which remain essentially in the same plane, favorable performace results.

SUMMARY OF THE INVENTION

The invention includes an elastic support having deformable ball and socket joints for fastening a trim piece between two movable elements, permitting the trim piece to remain in a median position defined by the equilibrium of the lateral deformations between the two movable elements perpendicular to the force of gravity and also perpendicular to the fastening planes where accidental thrusts can be exerted. The elastic support includes two ball and socket joints exhibiting an elastic recoil due to the adherized (or vulcanized) rubber-metal connection, the external rings being joined together by fitting into a common cylindrical tube, and the ball and socket joints being permanently connected with the bolt or nut fastening means, in a plane in which the principal relative back-and-forth movements occur.

In one aspect, the invention features an elastic support device comprising of an outer housing member having an inner surface and a thrust washer member, which is mounted within the outer housing member. The thrust washer member has a first face and a second face. A first attachment member has an at least partially spherical end, which is positioned at least partially within the outer housing member and abutting the first face of the thrust washer member. A first elastomeric mass is positioned at least partially within the outer housing member and at least partially surrounding the first attachment member. The first elastomeric mass is attached to the inner surface of the outer housing member for maintaining the at least partially spherical end of the first attachment member in contact with the first face of the thrust washer member. A second attachment member has an at least partially spherical end which is positioned at least partially within the outer housing member and abutting the second face of the thrust washer member. A second elastomeric mass is positioned at least partially within the outer housing member and at least partially surrounding the second attachment member. The second elastomeric mass is attached to the inner surface of the outer housing member for maintaining the second attachment member in contact with the second face of the thrust washer member.

In another aspect, the invention features an elastic support device comprising of an outer housing member having an inner surface. A thrust washer member is mounted within the outer housing member. The thrust washer member has a first face and a second face. A first attachment member has an at least partially spherical end which is positioned at least partially within the outer housing member and abutting the first face of the thrust washer member. A first elastomeric mass, which is positioned at least partially within the outer housing member and at least partially surrounding the first attachment member, is attached to the inner surface of the outer housing member for maintaining the at least partially spherical end of the first attachment member in contact with the first face of the thrust washer member. A second attachment member having an at least partially spherical end is positioned at least partially within the outer housing member and abutting the second face of the thrust washer member. A second elastomeric mass, which is positioned at least partially within the outer housing member and at least partially surrounding the second attachment member, is attached to the inner surface of the outer housing member for maintaining the second attachment member in contact with the second face of the thrust washer member.

The outer housing member comprises an outer shell member and a first substantially annular member which is mounted within the outer shell member, adjacent to the first face of the thrust washer member and surrounding the first elastomeric mass, the first elastomeric mass being adhered to the first substantially annular member; and a second substantially annular member which is mounted within the outer shell member adjacent to the second face of the thrust washer member surrounding the second elastomeric mass, which is adhered to the second substantially annular member. When the elastic support device is in an unflexed state, the first elastomeric mass and the second elastomeric mass are both prestressed for urging the at least partially spherical end of the first attachment member and the at least partially spherical end of the second attachment member against the first face of the thrust washer member and against the second face of the thrust washer member, respectively. The first elastomeric mass is prestressed during the manufacture of the elastic support device by urging the first substantially annular member towards the first face of the thrust washer member, and the second elastomeric mass is prestressed during the manufacture by urging the second substantially annular member towards the second face of the thrust washer member.

BRIEF DESCRIPTION OF THE DRAWINGS

A preferred embodiment of the invention is described in greater detail below with reference to the accompanying drawings, wherein.

DESCRIPTION OF THE PREFERRED EMBODIMENT

Figure 1:
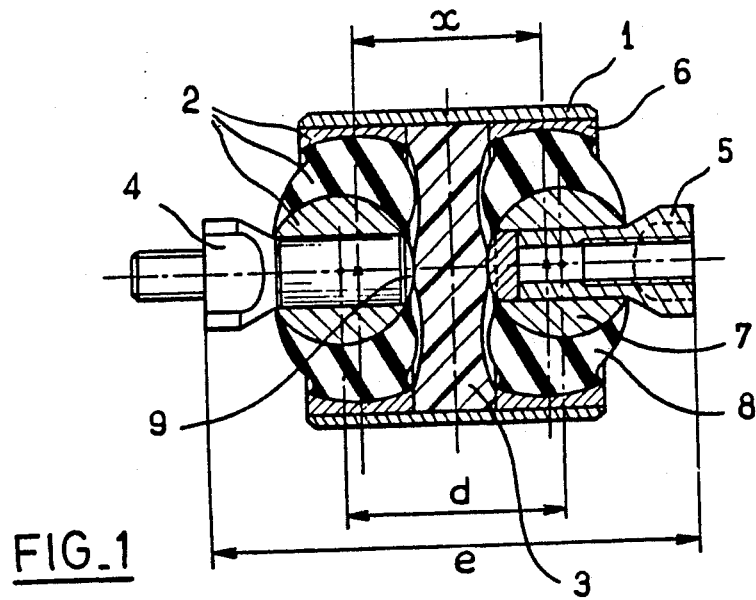
FIG. 1 shows, in axial cross section along an axis of revolution, the elastic support employing deformable ball and socket joints in the aligned position, in the absence of forces.

FIG. 1 is an axial cross section of an elastic support employing deformable ball and socket joints according to the invention. In the absence of the force of gravity and forces causing a flexure from the equilibrium position, the assembly displays a symmetry of revolution. An assembly tube 1, preferably made of steel, provides the connection between two identical elastically deformable ball and socket joints 2, by fitting their exterior rings 6 therewithin. A thrust washer 3, preferably made of an antifriction material such as polyethylene and having, even more preferably, a molecular weight of at least 500,000, is interposed, i.e., fitted, between the exterior rings 6. Preferably, both of exterior rings 6 and thrust washer 3 are force fitted within assembly tube 1. The fastening is preferably provided, on one side, by a spindle 4, and on the other side, by a threaded spindle 5, although many other bolt-bolt or nut-nut combinations are possible, the choice being limited only by accessibility. The fastening of the trim side permanently exerts gravitational forces perpendicular to the longitudinal axis of the device and to the accidental thrusts, such as in the direction of the axis, from contact with passengers. The fastening opposite the base contact side will usually undergo translational movements in its plane, for which reason the bolt/nut fastening is preferred.

Preferably, the spindles 4 and 5 are permanently connected to the inside rings (or ball shaped members) 7 of the elastically deformable ball and socket joints 2 by a clamped fitting, in an operation which is conducted prior to installation in the assembly tube 1.

Each elastically deformable ball and socket joint 2 is fabricated independently by molding its elastomer mass 8. During the reticulation (or vulcanization) and under the action of heat, an intimate chemical bond called adherization is formed with the rigid external rings 6 and inside rings 7. Each external ring 6, preferably made of steel or reinforced plastic, preferably has an inside surface which is concave in an essentially spherical fashion. Each inside ring (or ball shaped member) 7, preferably made of metal, preferentially has an external surface which is essentially spherical and convex, in the shape of a ball and socket joint, so that the conical back-and-forth movements, of the elastomer 8, which connects the rings 6 and 7, occur with an essentially constant dimension. That is, the degree of spherical curvature provided on the inside rings 7 and the external rings 6 is similar, such that a substantially constant thickness of elastomeric mass therebetween is achieved. A radial precompression improves the alternating fatigue strength, e.g., by a mechanical hammering of the external ring 6, which is destined for fitting into the assembly. After this operation the ball and socket joints 2, assembled from the inside rings 7, the external rings 6 and the elastomeric masses 8 pre-stressed as described are force fitted into the assembly tube 1 until the inside rings 7 contact the thrust washer 3. The ball and socket joints 2 are then urged even further inwards, in order to apply an appropriate degree of thrust to the elastomeric masses 8.

Figure 2:
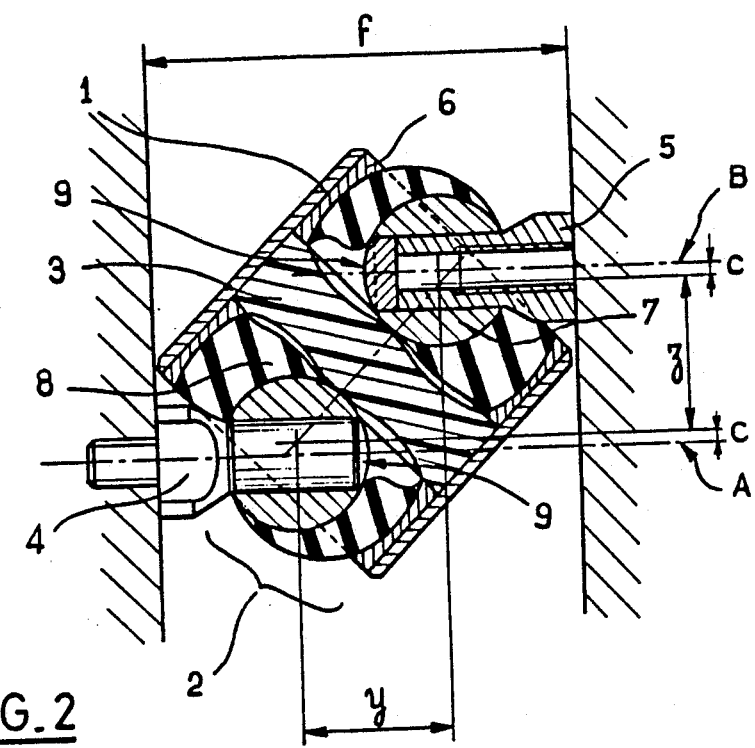
FIG. 2 shows the same axial section of the device, in a position near maximum flexure, perpendicular to the plane of the cross section.

The elastically deformable ball and socket joint 2 preferably has essentially a vertical plane of symmetry in the free (or unflexed) state. In this configuration the spindles 4 and 5 are substantially permanently joined to the internal ring 7 by force fitting. The fastening can also optionally be secured by riveting (or otherwise securing by means well known in the art) the free end of the spindles 4 and 5, if there is reason to fear low strength on account of their small diameter. In any case, a spherical shape is preferably maintained on their free end 9, by deformation of material and machining of the bevel exhibited by the internal ring 7. That is, when spindles 4 and 5 and inside rings 7 are assembled, the inwardly facing surface preferably exhibit a smooth spherical finish. Additionally, as shown in FIGS. 1 and 2, the free ends 9 of the spindles 4 and 5 are provided with an encircling beveled surface for facilitating the force fitting of the spindles 4 and 5 into the inside rings 7. After the fitting of the external rings 6 in the assembly tube 1, the slight axial deformation of the elastomer mass 8, achieved as described above, exerts a permanent contact of the spherical free ends 9 on either side of the thrust washer 3.

FIG. 2 shows the same device when the deformable pieces undergo a substantial deviation which may typically be maximum. The free ends 9, in permanent spherical contact, pivot on the thrust washer 3, which preferably has a slightly concave shape, in revolution, such that the deformed surfaces of the elastomer compound 8 come into contact against the thrust washer 3 when the free ends 9 are drawn to one side, as the result of a large deviation.

Under the effect of the elastic deformation which separates the axes A and B, the axes A and B remaining essentially parallel during the deformation of the supports, there is a slight eccentricity c which occurs between the internal rings 7 and the external rings 6. This eccentricity c increases the vertical distance between the axes A and B over the distance z between the centers of the external rings 6. Additionally, as can be seen from a comparison of FIGS. 1 and 2, the horizontal distance x between the centers of the outside rings 6 in the nondeformed state is decreased to y following deformation.

In case an accidental thrust on the trim piece, it is the free ends 9 which provide a rigid reaction by their contact against the thrust washer 3, when the deviation is insufficient to release them from permanent contact. In the aligned position shown in FIG. 1, the latter is due to the axial deformation which passes from the interaxial distance d of the inside rings 7 to the interaxial distance x of the external rings 6 during assembly. Such a permanent contact exerting a prestress of several deca-Newtons does not necessarily prevent detachment by an act of vandalism in which the perpetrator exerts a traction force on the trim piece. The axial rigidity of the elastically deformable ball and socket joints 2 rapidly limits the effect of this traction to several tens of daN, thereby preventing the destruction of the piece.

In the deformed position shown in FIG. 2, the free ends 9 of each spindle 4 or 5 escape from contact when the surface of the elastomer mass 8 takes over their role and thus, with a rigidity increased by the large amount of surface in contact, provides resistance against accidental thrusts on the trim piece.

In the deformed position shown in FIG. 2, the distance f between the contact planes is reduced as compared to the distance a in the aligned position, but the replacement of contact by the elastomer mass 8 in the role of the free ends 9 allows the difference e-f to be not necessarily equal to the deviation x-y due to the rotation of the external rings 6 held by the assembly tube 1.

If it is desirable for the distances e and f to remain close to one another, the conformation of the two surfaces of the thrust washer 3 make it possible to remedy the geometric deviation x-y and to reduce its effect on e-f.

When alternating movements occur, the component of gravity, balanced by the moderate angular rigidity of the set of elastic articulations 2, defines an essentially horizontal trajectory, in elastic deflection, of several millimeters. Nevertheless, the tangential friction forces exerted either by the free ends 9 or by the elastomer mass 8 on the thrust washer 3 exhibit orders of magnitude close to the force of gravity, and thereby prevent, substantially under all circumstances, any periodic vibration of the trim piece. The vertical equilibrium of the assembly is achieved without disadvantage with a statism, i.e. an altitude tolerance of several millimeters. The transverse positioning also makes possible a substantially positive stop for the trim piece. This allows a deviation but opposes untimely traction, such as, vandalism or accidental squashing, with sufficient rigidity.

As for the positioning, which could be called longitudinal in relation to the fastening planes, this positioning results from the elasticity of the support device and the weight of the trim piece to produce an elastic equilibrium therebetween. The displacements between the trim piece and the support systems typically are symmetrical. However, if there are variations of thrust under each of its supports the displacement may be asymmetrical. In particular, when there is an exaggerated accidental thrust at the level of one of the deformable ball and socket joint supports, with no counterbalancing force on the opposite side, the deviation of the axes A and B may increase. Because of the eccentricity c, the rigidity of the assembly may then become ten to twenty times higher than the initial value, which may result for an oblique sliding reaction on the thrust washer 3. This thrust is applied by the elastomer mass 8 deformed on the contact zones almost aligned on either side of the thrust washer 3, and not by the ball and socket joints, separated by z+2c. The rocking torque of the assembly tube 1 is therefore limited, due to the shape of the thrust washer. This limitation of the rocking torque consequently avoids undesirable contact between the assembly tube 1 and the contact planes.

In summary, the invention contributes a vertical hold down, the positioning of which can be achieved in an elastically balanced manner between the contact bases in periodic lateral displacement, while allowing the positive contact required by a decorative or protective trim piece.

It makes possible a secure vertical positioning, without oscillation, because its great flexibility can be effectively damped, while exhibiting the advantages of a simple elastic fastening by bolt or nut.

The processes for manufacture of the invention require only techniques which are conventional and well known in the rubber industry, in particular the radial hammering to apply prestress to the elastic rings, which guarantees a very high resistance to alternating fatigue, and which significantly surpasses the service life obtained with conventional elastic support pieces.

In summing up, one aspect of the invention resides broadly in the elastic support having deformable ball and socket joints for fastening a trim piece between two mobile elements, permitting the trim piece to remain in a median position, defined by the equilibrium of lateral deformations between the two mobile elements, perpendicular to the force of gravity and also perpendicular to the planes of fastening, where accidental thrusts can be exerted, characterized in that it comprises two ball and socket joints 2 exhibiting an elastic recoil due to the adherized (or vulcanized) rubber-metal bond, the external rings 6 being permanently fitted into a common assembly tube 1, the internal rings 7 in the shape of ball and socket joints, being permanently connected with fastening means by a spindle 4 or threaded spindle 5 in a plane in which the principal relative back-and-forth movements take place, and coming into contact with a thrust washer 3.

Another aspect of the invention resides broadly in the elastic support having deformable ball and socket joints, characterized in that the thrust washer 3 exhibits a revolutionary conformation on both its sides, such that they can contact and be contacted by either the free ends 9 of the spindle or threaded spindle 4 or 5, or the elastomer mass 8 of the elastic recall ball and socket joints 2, without the distance between the contact planes being significantly modified by the action of the deformations.

Yet another aspect of the invention resides broadly in the elastic support with deformable ball and socket joints, characterized in that the thrust washer 3 is made of polyethylene having a molecular weight of at least 500,000.

All of the patents, patent applications and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. An elastic support device, said elastic support device comprising:
    an outer housing member having an inner surface;
    a thrust washer member mounted within said outer housing member, said thrust washer member having a first face and a second face;
    a first attachment member, said first attachment member having an at least partially spherical end positioned at least partially within said outer housing member and abutting said first face of said thrust washer member;
    a first elastomeric mass positioned at least partially within said outer housing member and at least partially surrounding said first attachment member, said first elastomeric mass being attached to said inner surface of said outer housing member for maintaining said at least partially spherical end of said first attachment member in contact with said first face of said thrust washer member;
    a second attachment member, said second attachment member having an at least partially spherical end positioned at least partially within said outer housing member and abutting said second face of said thrust washer member; and
    a second elastomeric mass positioned at least partially within said outer housing member and at least partially surrounding said second attachment member, said second elastomeric mass being attached to said inner surface of said outer housing member for maintaining said second attachment member in contact with said second face of said thrust washer member.

2. An elastic support device according to claim 1, wherein said outer housing member comprises an outer shell member, a first substantially annular member mounted within said outer shell member adjacent said first face of said thrust washer member and surrounding said first elastomeric mass, said first elastomeric mass being attached to said first substantially annular member, and a second substantially annular member mounted within said outer shell member adjacent said second face of said thrust washer member and surrounding said second elastomeric mass, said second elastomeric mass being attached to said second substantially annular member.

3. An elastic support device according to claim 1, wherein said first face of said thrust washer member and said second face of said thrust washer member are both provided with a surface having a rounded convex central portion at least partially encircled by an annular concave groove.

4. An elastic support device according to claim 2, wherein said first face of said thrust washer member and said second face of said thrust washer member are both provided with a surface having a rounded convex central portion at least partially encircled by an annular concave groove.

5. An elastic support device according to claim 1, wherein when said elastic support device is in an unflexed state, said first elastomeric mass and said second elastomeric mass are both urged for applying a thrust on said at least partially spherical end of said first attachment member and said at least partially spherical end of said second attachment member against said first face of said thrust washer member and against said second face of said thrust washer member, respectively.

6. An elastic support device according to claim 2, wherein when said elastic support device is in an unflexed state, said first elastomeric mass and said second elastomeric mass are both urged for applying a thrust on said at least partially spherical end of said first attachment member and said at least partially spherical end of said second attachment member against said first face of said thrust washer member and against said second face of said thrust washer member, respectively.

7. An elastic support device according to claim 3, wherein when said elastic support device is in an unflexed state, said first elastomeric mass and said second elastomeric mass are both urged for applying a thrust on said at least partially spherical end of said first attachment member and said at least partially spherical end of said second attachment member against said first face of said thrust washer member and against said second face of said thrust washer member, respectively.

8. An elastic support device according to claim 1, wherein said thrust washer member comprises an antifriction material.

9. An elastic supporting device according to claim 8, wherein said polyethylene has a molecular weight of at least 500,000.

10. An elastic support device according to claim 9 wherein said polyethylene has a molecular weight of at least 500,000.

11. An elastic support device according to claim 3, wherein, when said elastic support device is in an unflexed state, said at least partially spherical end of said first attachment member is maintained in contact with said rounded convex central portion provided on said first face of said thrust washer member by said first elastomeric mass, and said at least partially spherical end of said second attachment member is maintained in contact with said rounded convex central portion provided on said second face of said thrust washer member by said second elastomeric mass.

12. An elastic support device according to claim 1, wherein said first attachment member comprises a first substantially ball shaped surface positioned at least partially within said outer housing member and at least partially surrounded by said first elastomeric mass, said at least partially spherical end of said first attachment member comprising a portion of said first substantially ball shaped surface, and wherein said second attachment member comprises a second substantially ball shaped surface positioned at least partially within said outer housing member and at least partially surrounded by said second elastomeric mass, said at least partially spherical end of said second attachment member comprising a portion of said second substantially ball shaped surface.

13. An elastic support device according to claim 12, wherein, said first attachment member additionally comprises a first substantially ball shaped member having a first aperture therethrough and a first elongated member positioned within and passing through said first aperture, said first substantially ball shaped surface comprising the surface of said first substantially ball shaped member and said at least partially spherical end of said first attachment member and wherein said second attachment member additionally comprises a second substantially ball shaped member having a second aperture therethrough and a second elongated member positioned within and shaped surface comprising the surface of said second substantially ball shaped member and said at lest partially spherical end of said second attachment member.

14. An elastic support device according to claim 13, wherein said first elongated member is force fitted into said first aperture, and wherein said second elongated member is force fitted into said second aperture.

15. An elastic support device according to claim 14, wherein each of said first elongated member and said second elongated member is provided with a bevel adjacent said at least partially spherical end for facilitating said force fitting.

16. An elastic support device, said elastic support device comprising:
   an outer housing member having an inner surface;
   a thrust washer member mounted within said outer housing member, said thrust washer member having a first face and a second face;
   a first attachment member, said first attachment member having an at least partially spherical end positioned at least partially within said outer housing member and abutting said first face of said thrust washer member;
   a first elastomeric mass positioned at least partially within said outer housing member and at least partially surrounding said first attachment member,
   said first elastomeric mass being attached to said inner surface of said outer housing member for maintaining said at least partially spherical end of said first attachment member in contact with said first face of said thrust washer member;
   a second attachment member, said second attachment member having an at least partially spherical end positioned at least partially within said outer housing member and abutting said second face of said thrust washer member; and
   a second elastomeric mass positioned at least partially within said outer housing member and at least partially surrounding said second attachment member, said second elastomeric mass being attached to said inner surface of said outer housing member for maintaining said second attachment member in contact with said second face of said thrust washer member;
   wherein said outer housing member comprises an outer shell member, a first substantially annular member mounted within said outer shell member adjacent said first face of said thrust washer member and surrounding said first elastomeric mass, said first elastomeric mass being attached to said first substantially annular member, and a second substantially annular member mounted within said outer shell member adjacent said second face of said thrust washer member and surrounding said second elastomeric mass, said second elastomeric mass being attached to said second substantially annular member; and
   wherein when said elastic support device is in an unflexed state, said first elastomeric mass and said second elastomeric mass are both urged for applying a thrust on said at least partially spherical end of said first attachment member and said at least partially spherical end of said second attachment member against said first face of said thrust washer member and against said second face of said thrust washer member, respectively;
said first elastomeric mass being urged during the manufacture of said elastic support device for applying a thrust on said first substantially annular member towards said first face of said thrust washer member, and said second elastomeric mass being urged during the manufacture for applying a thrust on said second substantially annular member towards said second face of said thrust washer member.

17. An elastic support device according to claim 16 wherein said first elastomeric mass and said second elastomeric mass are radially prestressed by mechanical hammering of said first and second substantially annular members, in order to improve the alternative fatigue restistance in the principal relative back-and-forth movements.

* * * * *

UNITED STATES PATENT AND TRADEMARK OFFICE
CERTIFICATE OF CORRECTION

PATENT NO. : 4,971,285

DATED : November 20, 1990

INVENTOR(S) : Jean-Pierre BECHU

It is certified that error appears in the above-identified patent and that said Letters Patent is hereby corrected as shown below:

In column 5, line 39, after 'case', delete "an" and insert --of--.

In column 5, line 62, after 'distance', delete "a" and insert --e--.

Signed and Sealed this

Fourteenth Day of July, 1992

Attest:

DOUGLAS B. COMER

*Attesting Officer*     *Acting Commissioner of Patents and Trademarks*